Patented Aug. 13, 1935

2,011,225

UNITED STATES PATENT OFFICE 2,011,225

ANTIGEN AND PROCESS OF PRODUCING IT

Albert Paul Krueger, Berkeley, Calif.

No Drawing. Application March 16, 1933,
Serial No. 661,085

12 Claims. (Cl. 167—78)

It is the object of my invention to produce sterile antigens which have high specific activity and little or no non-specific activity.

By the term "antigen" I mean any substance which is directly derived from pathogenic micro-organisms capable of producing immunological response and which when administered parenterally is capable of producing an immunological response detectable by the usual immunity or sensitivity tests. The term "micro-organisms" is used in its accepted meaning, of organisms which can be seen only with the aid of the miscroscope; and excludes the so-called, filterable viruses.

More specifically, it is the object of my invention to produce sterile antigens which contain substantially unaltered the components of the living micro-organisms, and especially those of bacteria, as those components have the specific activity of the cells, but which are substantially free from metabolic and degradation products, which have non-specific activity and produce untoward reactions.

By "degradation products" is meant those products which are produced by either denaturation or cleavage, or both.

By my invention I can produce antigens having some or all of the three following distinctive and valuable characteristics:

1. A high content of specifically effective material.
2. Little or no content of metabolic products.
3. Little or no content of degradation products.

It has long been recognized that living micro-organisms produce a better and more complete immunological response than has been obtained by any known sterile antigen derived from those micro-organisms. In man, however, it is ordinarily impractical to use living micro-organisms as antigens, because of the dangers involved. Hence in using antigens derived from micro-organisms it is ordinarily necessary that such antigens be sterile.

But in obtaining sterility the processes heretofore used have always resulted in a denaturation and/or modification of the cellular components of the micro-organisms. This denaturation and/or modification results in:

1. A reduction in the specific antigenic components.
2. The inclusion of metabolic products, and the production of non-specific degradation products, both of which produce untoward reactions.

The most commonly employed processes of producing sterile cell-component-containing antigens involve killing the micro-organisms by heat and/or a germicide. Killing them in either of these ways results in an undesirable denaturation and/or modification of the cellular components, varying with the degree of temperature and the concentration and kind of the germicide used.

Other processes of killing the micro-organisms have also been used: as by exploding them by the sudden release of a slowly, accumulated high pressure of gas which permeates the cells; by lysis, as with bacteriophage, ferments, enzymes, and certain immune sera; and by autolysis. The products which have been so obtained, however, contain cell metabolites and/or degradation products, both of which are non-specific in character and produce untoward reactions.

In some processes, in addition to the killing of the organisms the cells are disrupted, as by grinding or by the use of chemicals; but always, so far as I am aware, the final antigen heretofore obtained has included cell metabolites and/or degradation products in considerable amounts.

Thus all of the treatments heretofore used for producing sterile antigens from micro-organisms, so far as I am aware, have resulted in denaturation and/or modification of the cell components; with some consequent loss of specific immunological-response-producing activity, and/or the production of undesirable non-specific cell metabolites and/or degradation products in considerable amounts.

This denaturing and/or modifying effect of the common processes of producing sterile antigens from micro-organisms has previously been recognized, and many attempts have been made to avoid it. Yet, so far as I am aware, no previous attempt has been successful. By my process, however, the undesirable denaturation and/or modification of the cell components, and the inclusion of metabolites, may be largely if not wholly avoided.

According to my invention, the micro-organisms, usually but not necessarily bacteria, of any desired strain or strains, are grown in or on any suitable medium, such as agar, under appropriate conditions. The living mcro-organisms, preferably while young and vigorous, are suspended in a substantially isotonic solution, desirably buffered, such as Ringer's solution; and are then washed several times in changes of such solution, with the last change conveniently of the volume necessary to make a thick creamy suspension. The number of cells present is then determined by appropriate methods, of which several are known.

This suspension of living micro-organisms is then ground, as in a ball mill. The grinding is done under conditions which:

a. Avoid contamination by other micro-organisms;

b. Avoid denaturation by the action of heat, desirably by avoiding rise in temperature materially above room temperature;

c. Avoid denaturation by the action of chemical or physical agents.

The grinding is desirably continued until substantially all of the micro-organisms are broken up and their intra-cellular components are exposed and either dissolved or dispersed in the solution. Although it is practically impossible in any reasonable time to get a disruption of 100% of the micro-organisms being ground, I have found that in a suitable ball-mill (such as the one described hereinafter) I can uniformly get disruption of over 90% of the total number of micro-organisms in from ten to twelve hours.

But the resultant creamy mass, containing fragments of the micro-organisms and dissolved and dispersed intra-cellular components thereof, is not sterile, because of the presence of some unbroken micro-organisms, at least part of which are still living.

To obtain sterility, this creamy mass is now immediately filtered, conveniently by suction, through a filter which holds back the whole or unbroken micro-organisms, whether living or dead, but which permits the fragments of the micro-organisms and the dissolved and dispersed intra-cellular constituents of such micro-organisms, to pass through. It is highly desirable that this filtration be done promptly after the completion of the grinding operation, to minimize hydrolysis and other destructive action.

The most desirable filters which I have found for this filtration are the ultra-filters provided by thin sterile acetic-collodion membranes, which will be described in more detail hereinafter. These membranes are sieve-like filters having relatively short substantially uniform tubular pores which may be controllably varied in cross-section and length by known processes of manufacture. These ultra-filters have given results which are vastly superior to those obtainable by common candle-type filters, such as the Berkefeld and the Chamberland filters; for these candle-type filters, which have relatively long passages and carry negative electric charges on the surfaces of these passages, although excellent in preventing whole micro-organisms from passing through, do not effectively permit the fragments and the dissolved and dispersed intra-cellular components of the micro-organisms to pass through in undiminished concentration, probably because of adsorption due at least in part to positive electric charges on such fragments and intra-cellular components and to the negative electric charges on the walls of the passages in filters of the candle type. This adsorption is largely if not wholly avoided when suitable ultra-filters of the membrane type are used.

The filtrate which passes through the ultra-filter is my sterile antigen. It may be diluted as desired, and administered directly without further treatment. The administration may be in any suitable parenteral manner, but is desirably either intradermal or subcutaneous.

As a matter of precaution, of course, the antigen is tested for sterility after filtration and before administration. This testing may be in any usual manner. If the filtrate is found not to be sterile, as may sometimes occur because of some imperfection or other inadequacy in the filtering membrane, it is refiltered, desirably through a new membrane.

If the antigen is to be used immediately on filtration, or can be stored under definitely aseptic conditions, I believe there is an advantage in so using it. However, the danger of contamination is always great, even with the utmost care. To avoid this danger, I prefer to make the preparation bacteriostatic without denaturing or modifying it.

Not all preservatives are suitable for this. For instance, I have found that both phenol and cresol, which until recently have been the most common preservatives, are ordinarily definitely unsuitable; because when they are added in sufficient concentration to produce bacteriostasis they also produce an undesirable denaturation and/or modification of the cell components which have passed through the filter, and it is essential to my invention that such denaturation and/or modification be substantially avoided.

I have found, however, that "Merthiolate" (a trade-marked brand or make of sodium ethylmercurithiosalicylate) is a suitable preservative for this; for it can be used in sufficient concentration—1:1,000,000 to 1:100,000—to produce effective bacteriostasis without causing any appreciable denaturation and/or modification of such cell components over a period of many months if the antigen is kept at room temperature (20° C.) or below. Therefore, for assurance of safety, I prefer to add enough "Merthiolate" to my antigen to produce a "Merthiolate" concentration of about 1:100,000.

A ball mill which I have found highly suitable for grinding the micro-organisms when making my antigen is a cylinder of steel or porcelain, about 4 inches in diameter by 6 inches long, rotatable about its axis with that axis substantially horizontal, and containing a sufficient quantity of rustless-steel balls about ¼ inch to ⅜ inch in diameter to fill the cylinder about two-thirds full. Such a ball mill may be operated indefinitely at room temperature to grind the suspension of micro-organisms without producing a rise of more than a degree or two in the temperature of such suspension, so that denaturation and/or modification of the micro-organisms and their cell fragments and contents are avoided. The parts of the ball mill are made of such material that little abrasion of the cylinder and of the balls occurs; and that what little material is abraded off is for the most part of sufficiently large size so that it will not pass through the ultrafilter, and that any which does pass such filter is innocuous.

The acetic-collodion membrane which I prefer to use as the ultrafilter is described in a paper by R. C. Ritter and myself (Journal of General Physiology, 1929–30, vol. 13, p. 409.) In general it is prepared by impregnating a hard filter-paper disk with an acetic-collodion solution, of controlled concentration, gelling the collodion in water, and washing repeatedly with sterile distilled water to remove all traces of acid. By varying the concentration of the collodion in the acetic acid, the length and the size of the pores in the membrane can be controlled—increasing the concentration of the collodion increases the thickness of the membrane and hence the length of the pores and decreases the pore cross-section.

The membrane I ordinarily use is made from a collodion solution containing 4.5 grams of the dried collodion per 100 cc. of glacial acetic acid; which gives a pore-size of about 200 micro-microns in diameter and about 0.03 centimeters in length.

In making my antigen, I may use micro-organisms of a single strain, and carry the process through from beginning to end with that single strain, to make a univalent antigen; or I may use a plurality of strains and/or of species, preferably grown separately but mixed in any desired proportions either before or after the grinding and the filtering operation, and may carry the mixed strains and/or species through together from the grinding operation to the end of the preparation process, to produce a polyvalent antigen or a mixed antigen.

The following are examples of my invention:

*Example 1—Pertussis antigen.*—Various strains of the pertussis bacillus (Bordet-Gengou bacillus) are isolated from cases of pertussis, desirable in the initial stages of the illness, and grown separately on glycerine-potato-extract agar to which is added about 20% of human blood, conveniently at the usual incubator temperature of about 37° C. The bacilli so grown are suitably harvested in Ringer's solution, having a hydrogen ion concentration of about pH 7.4, or barely on the alkaline side of neutrality. I prefer to use a mixture of strains; and to use recently acquired strains, by starting new strains whenever they are available and discarding some or all of the older strains.

The harvested bacilli are washed thoroughly by several changes of the Ringer's solution. The washing is desirably a thorough one, so that any metabolites co-present with the bacilli may be removed. After the washing the suspension is usually about neutral, or slightly alkaline, of about pH 7.0 to pH 7.2. The various strains used may be mixed either before or after the washing.

The mixed bacilli are then ground and filtered, in the manner already described. The final concentration, after the filtration, may be varied as desired. I find a convenient concentration to be one in which a cubic centimeter contains the antigen derived from ten billion pertussis bacilli.

The resultant pertussis antigen thus obtained, after being tested and found sterile, may be used without further treatment; but for safety I prefer to add sufficient "Merthiolate," about one part in a hundred thousand, to insure bacteriostasis. Good results have been obtained with the antigen both with and without the "Merthiolate" preservative.

This antigen may be effectively used for both prophylaxis against and treatment of pertussis. In general prophylaxis, four injections at intervals of two days, with the doses increasing from 0.2 cc. to 1.0 cc. in the concentration described above, give good results. In exposed individuals, three injections on three successive days, with the first dose 0.2 cc. and the other two doses 0.5 cc. each, may be used. In definite cases of pertussis, daily doses of 0.5 cc. for four or five days, followed by one or two doses of 1.0 cc. daily, may be used. These are all variable, as a matter of course, at the discretion of the physicians in view of conditions encountered. The administration is usually subcutaneous, but concomitant intradermal administration is often advantageous in following the establishment of immunity.

Definite and prompt relief of symptoms and signs of the disease have been noted in over 75% of about 200 definite cases of pertussis which have been treated. In none of the treated cases were any untoward reactions observed. Further, at least 75% of the treated cases made a complete recovery much more quickly than commonly occurs.

*Example 2—Mixed respiratory antigen.*—Various strains of micro-organisms found in the diseased nose and throat, such as streptococci, staphylococci, B. influenzae, pneumococci, etc., are isolated, and grown separately on suitable media, such as that described in Example 1. The organisms are harvested, washed, mixed, ground, and filtered, as described in Example 1. The proportions of the various organisms may be varied as desired. Merthiolate is desirably added to the sterile filtrate, about one part to a hundred thousand.

The antigen thus obtained may be used with good effect in both chronic and acute respiratory diseases.

*Example 3—Arthritic antigen.*—The best results have been obtained by having this antigen an autogenous one. The micro-organisms are isolated from probable causative foci in the patient suffering from infectious arthritis. These organisms are then grown in suitable media, and treated as in Example 1 to obtain a sterile antigen therefrom. The antigen so obtained, with Merthiolate added for bacteriostasis if desired although that may not be deemed necessary, is then administered to the patient at the discretion of the physician according to the conditions existing.

*Example 4—Staphylococcus antigen.*—Various strains of staphylococci are isolated from staphylococcus infections, and are grown separately on suitable media, and treated as described in previous examples. "Merthiolate" is desirably added for bacteriostasis.

The antigen so obtained is parenterally administered both prophylactically and therapeutically, as described in connection with other examples. It may also be used by local application, as in a water-soluble base such as a tragacanth gel.

*Example 5—Tinea trichophytina antigen.*— Samples of fungus organisms are isolated from lesions; are grown in or on a suitable medium, preferably a fluid medium; and are suitably harvested, and treated as in previous examples, to obtain a sterile antigen therefrom.

The antigen thus obtained desirably has "Merthiolate" added to it to maintain bacteriostasis.

Such antigen may be used for the treatment of patients infected with tinea trichophytina; either by subcutaneous or intradermal injections, or topically in a suitable medium, such as a tragacanth gel, or in both ways, at the discretion of the physician and in accordance with the severity of the infection. It may also be used as a skin test, for diagnostic purposes.

The examples given are in no sense intended as limitations of my invention, but are merely to show the wide range of such invention. While my invention finds its most wide-spread application in connection with bacterial antigens, it is by no means limited to bacterial antigens; as is clear from Example 5 given above.

The antigens which I prepare by my process are not limited to prophylactic use, but find as great utility in the treatment of existing disease—such as pertussis, respiratory infections, arthritis, and staphylococcus and fungus infections, in the examples given. They act, perhaps by reason of having the cell components in substantially undenatured and unmodified form and perhaps by reason of the substantial absence of metabolites and/or degradation products, but probably for both reasons, to produce an immunological response which even in acute infections causes the patient in some manner to combat the disease more effectively. This has been found to be the case in the great majority of instances where my antigens have actually been used, in the treatment of both chronic and acute disease; and in no instance has the injection of my antigens produced any substantial untoward reaction.

I claim as my invention:

1. The process of producing a sterile antigen from pathogenic micro-organisms which induce an immunological response, which consists in grinding the living micro-organisms under conditions which substantially avoid denaturation and modification of their cell-components, then filtering through a filter which holds back the unbroken micro-organisms but permits the substantially unmodified cell-components of the broken-up micro-organisms to pass through.

2. The process of producing a sterile antigen from pathogenic micro-organisms which induce an immunological response, which consists in grinding the living micro-organisms in suspension in a buffered isotonic solution under conditions which substantially avoid denaturation and modification of their cell-components, then filtering through a filter which holds back the unbroken micro-organisms but permits the substantially unmodified components of the broken-up micro-organisms to pass through.

3. The process of producing a sterile antigen from pathogenic micro-organisms which induce an immunological response, which consists in grinding the living micro-organisms under conditions which substantially avoid denaturation and modification of their cell-components, then filtering through a filter which holds back the unbroken micro-organisms but permits the substantially unmodified components of the broken-up micro-organisms to pass through, and then adding to the filtrate a preservative which produces bacteriostasis but which at room temperature causes substantially no denaturation or modification of the antigenic components.

4. The process of producing a sterile antigen from pathogenic micro-organisms which induce an immunological response, which consists in washing the living micro-organisms in a buffered isotonic solution to make them substantially free from metabolites, then promptly grinding the living micro-organisms under conditions which substantially avoid denaturation and modification of their cell-components, and then filtering through a filter which holds back the unbroken micro-organisms but permits the substantially unmodified cell-components of the broken-up micro-organisms to pass through.

5. The process of producing a sterile antigen from bacteria capable of producing an immunological response, which consists in grinding the living bacteria under conditions which substantially avoid denaturation and modification of their cell-components, and then filtering through a filter which holds back the unbroken bacteria but permits the substantially unmodified cell-components of the broken-up bacteria to pass through.

6. The process of producing a sterile antigen from pertussis bacilli, which consists in grinding the living pertussis bacilli under conditions which substantially avoid denaturation and modification of their cell-components, then filtering through a filter which holds back the unbroken pertussis bacilli but permits the substantially unmodified components of the broken-up pertussis bacilli to pass through.

7. The process of producing a sterile antigen from pathogenic fungi capable of producing an immunological response, which consists in grinding the living pathogenic fungi under conditions which substantially avoid denaturation and modification of their cell-components, then filtering through a filter which holds back the unbroken pathogenic fungi but permits the substantially unmodified cell-components of the broken-up pathogenic fungi to pass through.

8. A sterile undenatured antigen which is derived from living pathogenic micro-organisms that are capable of producing an immunological response; which sterile undenatured antigen is capable of causing specific immunological response, and in which the antigenic material substantially consists of fragments and dissolved and dispersed cell-components of the micro-organisms in substantially undenatured condition.

9. A sterile undenatured antigen which is derived from living pathogenic micro-organisms that are capable of producing an immunological response; which sterile undenatured antigen is capable of causing specific immunological response, and in which the antigenic material substantially consists of fragments and dissolved and dispersed cell-components of the micro-organisms in substantially undenatured condition, and is substantially free from metabolic and degradation products.

10. A sterile undenatured antigen which is derived from living bacteria that are capable of producing an immunological response; which sterile undenatured antigen is capable of causing specific immunological response, and in which the antigenic material substantially consists of fragments and dissolved and dispersed cell-components of the bacteria in substantially undenatured condition.

11. A sterile undenatured antigen which is derived from living fungi that are capable of producing an immunological response; which sterile undenatured antigen is capable of causing specific immunological response, and in which the antigenic material substantially consists of fragments and dissolved and dispersed cell-components of the fungi in substantially undenatured condition.

12. A sterile undenatured antigen which is derived from living pertussis bacilli; which sterile undenatured antigen is capable of causing specific immunological response, and in which the antigenic material substantially consists of fragments and dissolved and dispersed cell-components of the pertussis bacilli in substantially undenatured condition.

ALBERT PAUL KRUEGER.